UNITED STATES PATENT OFFICE.

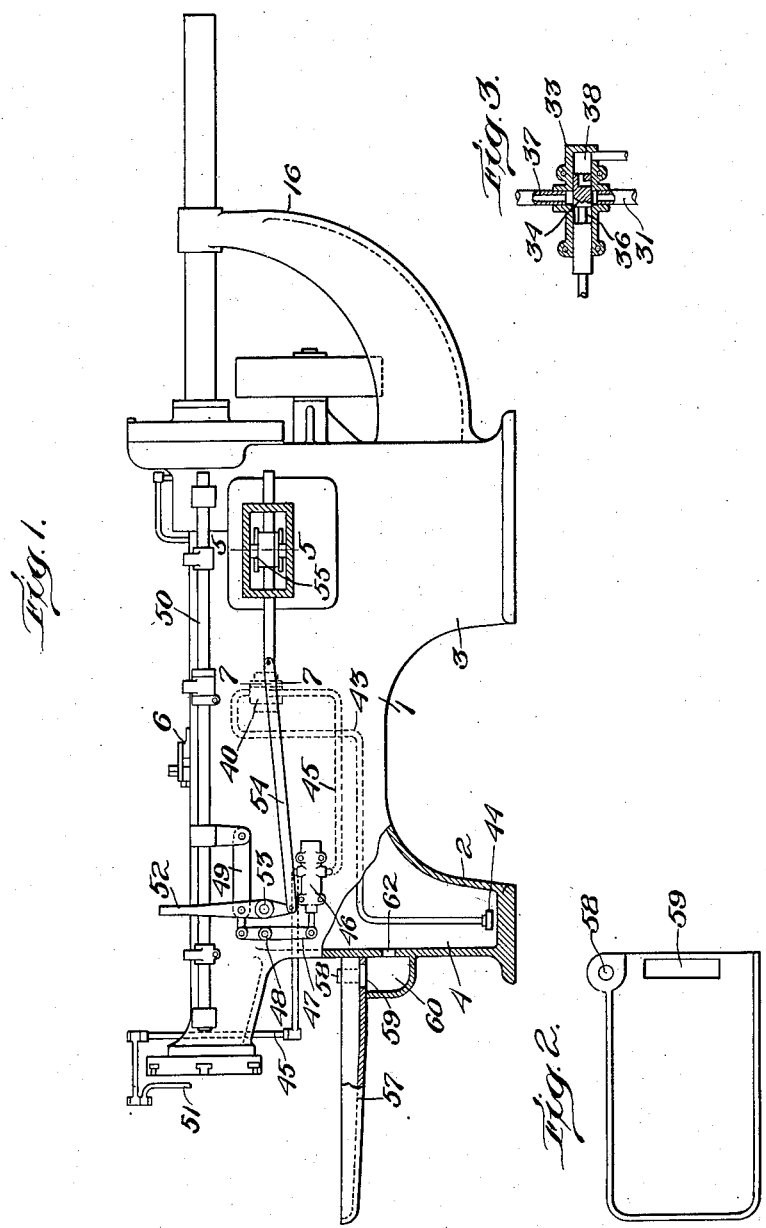

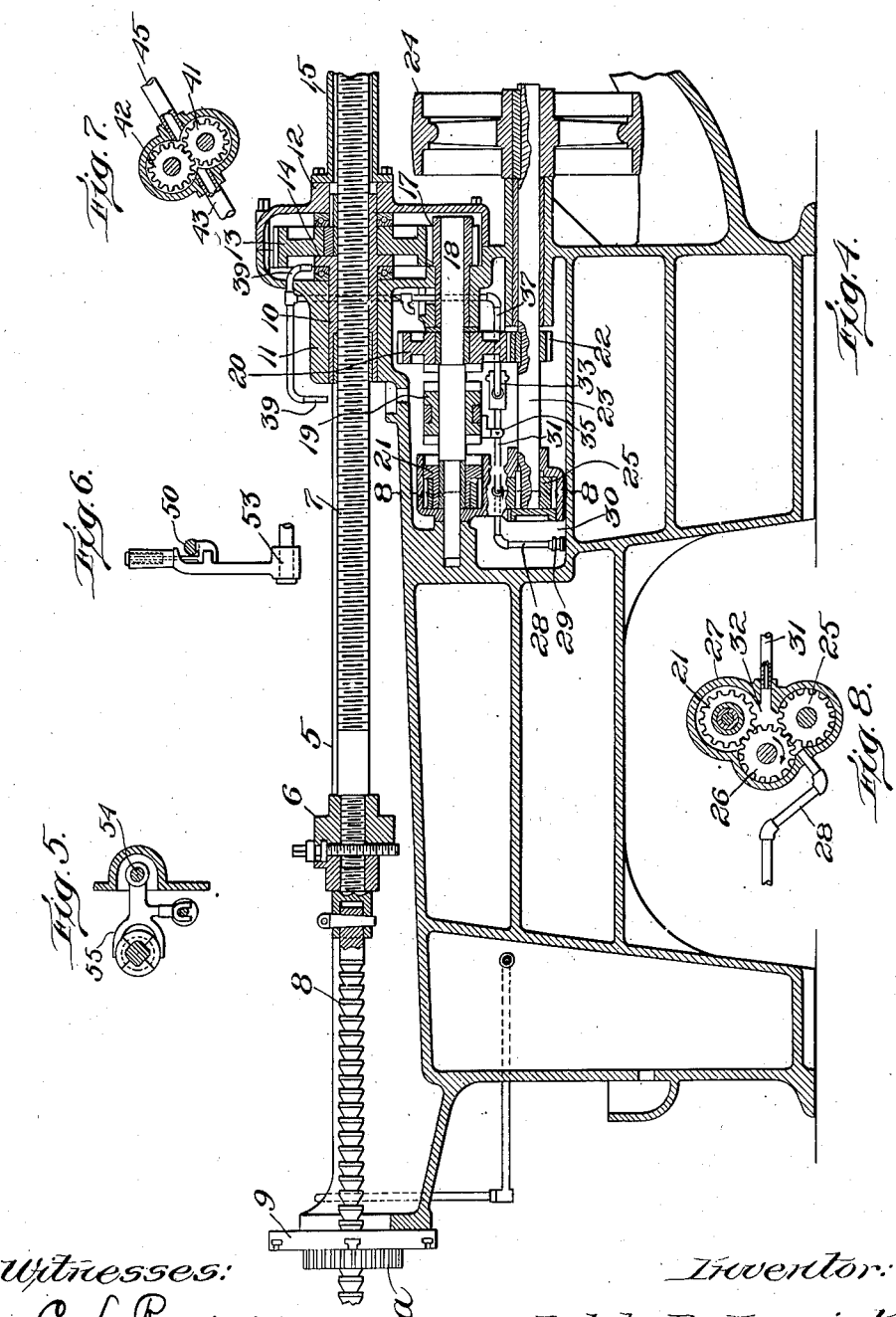

RALPH R. LAPOINTE, OF HUDSON, MASSACHUSETTS, ASSIGNOR TO LAPOINTE MACHINE TOOL CO., OF HUDSON, MASSACHUSETTS, A CORPORATION OF MAINE.

LUBRICATING MECHANISM.

1,103,301.  Specification of Letters Patent.  Patented July 14, 1914.

Original application filed November 14, 1911, Serial No. 660,235. Divided and this application filed February 28, 1912. Serial No. 680,429.

*To all whom it may concern:*

Be it known that I, RALPH R. LAPOINTE, a citizen of the United States, and resident of Hudson, county of Middlesex, and State of Massachusetts, have invented an Improvement in Lubricating Mechanisms, of which the following description, in connection with the accompanying drawings, is a specification, like letters on the drawings representing like parts.

This invention relates to lubricating mechanisms, and while various novel features thereof have other and general fields of usefulness, the improvements in their more complete embodiment are herein shown associated with a broaching machine of the type shown in my prior application Ser. No. 660,235, filed November 14, 1911, for broaching machine, of which the present case is a division.

Among the prime objects of the present invention are to provide a simple, effective lubricating system for lubricating the driving gearing of the machine and to provide a lubricant supply at the point of engagement of the tool with the work, this lubricant supply being preferably connected for control by the same means which controls the tool movement, so that the lubricant is only supplied while the work is actually going on.

According to one of the important features of the invention, a portion of the driving gearing for the tool or like operated part is utilized to form also a pump which, in the preferred embodiment, supplies lubricant to the gearing parts.

Further features of improvement have to do with a construction of drip catching pan and return connections to the oil tank, whereby a sediment pocket easily accessible for cleaning out is provided, and other conveniences in operation effected.

The invention will be better understood from the following detailed description, taken in connection with the accompanying drawings, and will be thereafter pointed out in the appended claims.

Referring to the drawings, Figure 1 is a side elevation, with parts broken away, in section of a machine having my improvements incorporated therewith; Fig. 2 is a detail plan view of a drip pan or tray, adapted to be swingingly mounted, as later described; Fig. 3 is a fragmentary detail, partly in section of a valve controlling device; Fig. 4 is a central longitudinal vertical section through the machine; Fig. 5 is a detail sectional view, approximately on line 5—5 of Fig. 1; Fig. 6 is a detail side view of a shifting lever; Fig. 7 is a detail sectional view of a pump, taken on line 7—7 of Fig. 1; and Fig. 8 is a sectional view on line 8—8 of Fig. 4.

A broaching machine, wherein for illustrative purposes the present improvements are shown as embodied, is fully described and claimed in my said prior application, and its construction and manner of operation need only be briefly summarized herein to the extent necessary for making clear the coöperative arrangement and manner of operation of the improved lubricating features. The machine is shown with a base framework 1, having suitable pedestal supports 2, 3, the former of these constituting an oil tank 4. This framework is formed with guideways 5, lengthwise extending along its upper portion for a crosshead 6 to which is fixed at one side an operating screw 7, and at its other side a broach 8, these typifying any suitable operating and operated parts. The broach 8 is herein shown as adapted to operate on a piece of work *a* held against a face plate 9 at the front end of the machine. The operating screw 7 extends rearwardly through a sleeve nut 10 journaled in spaced apart bearing portions 11, 12 formed at the top and rear portion of the framework 1. A spur gear 13 is suitably fixed on the sleeve nut 10 between the spaced apart bearing portions, being shown as fitting against a flange 14 on the sleeve nut. The rear extremity of the screw 7 extends into a bearing in protecting sleeve 15, shown as supported by an outboard bearing 16, extending from the framework. The gear 13 is in driven engagement with a pinion 17 fixed on a shaft 18 on which is splined a clutch sleeve 19. The shaft 18 also has loosely mounted thereon at either side of said clutch sleeve, gears 20 21, the gear 20 being shown as the larger and in mesh with a pinion 22 fixed on a prime driving shaft 23 which has keyed thereon a belt pulley 24 to receive power from any suitable source. The shaft 23 also has keyed thereon a pinion 25 in geared connection with the gear 21 through an intermediate idler 26, this gear train constituting the reverse or return drive when the clutch sleeve 19 is engaged with a clutch face on the pinion 21 and the gears 20, 22, constituting the direct or operative drive when the other end of the clutch sleeve is engaged with a clutch face on the gear 20.

The gears 25, 26, 21 are housed in a casing 27 which fits the extremities of the teeth of gears 25, 26 quite closely, but is formed to leave some little clearance space around the teeth of gear 21. An oil supply pipe 28 extends through the casing 27 into the space between the gears 25, 26 at the point where they separate, this pipe extending down and having its inlet end 29 near the bottom of a tank or oil container 30 formed in the rear portion of the framework 1. An oil delivery pipe 31 leads out from the side of the casing 27, opposite the pipe 28 and from an open space 32 formed by the special relative arrangement of the three gears, as shown. This gear arrangement is adapted to serve as a force pump for supplying lubricant, the operation being such that the gears 25, 26, as they separate adjacent the extremity of inlet pipe 28, create a suction and force the oil around in the pockets between their teeth and the casing, that carried around by the teeth of the pinion 25 being delivered directly into the space 32, while that delivered by the gear 26 circulates around the clearance space about the gear 21 and thence also into the space 32. The oil delivery pipe 31 has interposed therein a controlling valve 33, this valve being shown in detail in Fig. 3, and having a piston 34 connected to the clutch sleeve 19, as seen at 35, this piston having a reduced neck 36 adapted to establish connection between the pipe 31 leading thereto and a continuation 37 of said pipe to the point of oil delivery. This piston is adapted, upon being drawn out of its casing, to close the connection between pipes 31 and 37 and establish a by-pass or return connection from the pipe 31, as seen at 38 to return the oil to the tank. The pipe 37 leads up to supply the oil at suitable points upon the bearing parts, as seen at 39, and the effect of the connection 35 of the controlling piston 34 with the clutch sleeve 19 is to cause the oil to be continuously delivered to the bearing parts when the tool is moving on its working stroke, i. e. with the sleeve 19 moved to the right from the position in Fig. 4, so that the drive is through gears 20, 22, but to shut off the oil and by-pass it to the tank on the return stroke.

To supply lubricant to the tool at the cutting point, a pump 40 is mounted in the framework and driven by a suitable extension from the driving gearing described. This pump is provided with rotary gears 41, 42 fitting within the casing and these gears are adapted to draw in the lubricant from a pipe 43 which leads down to the bottom of tank 4, as seen at 44, and deliver lubricant through a pipe 45 which leads to a controller valve 46 which may be in all respects similar to the valve 33 shown in Fig. 3. The piston of this valve is operated by a lever 47 pivoted at 48 to the framework, and having a link connection 49 to a shipper rod 50 adapted to be operated by lugs on the cross-slide 6. The delivery pipe 45 from this valve discharges over the point of engagement of the tool with the work, as seen at 51. A lever 52 is pivoted at 53 and has a link connection 54 to operate the clutch sleeve 19, the fork connection for this purpose being designated 55. The lever 52 has a special form of detent and catch connection 56 for detachable engagement with the shipper rod 50 as seen in Fig. 6, but as this forms no part of the present invention and is specifically set forth and claimed in my said parent application, it need not be further alluded to here.

A drip pan or tray 57 is hinged at 58 to the frame by one corner, as best seen in Fig. 2, and has an opening 59 near its engagement with the frame, adapted to empty its contents into a sediment pocket 60 shown as formed integral with the frame and at the front thereof. This sediment pocket has an outlet 62 some little distance above its bottom emptying into the tank 4. With this construction the drippings from the operative point along with the cuttings drop on to the tray 57 and the oil along with some of the finer cuttings drains back through the passage 59 into the sediment pocket 60, where the cuttings, dust, and other foreign matter settle at the bottom and the clear oil runs back through the opening 62 into the tank, to be again circulated by the pump. The piston controller of valve 46 being connected as described, with the clutch shifting mechanism like the valve 33, is arranged to deliver the oil only on the cutting stroke and to by-pass it back to the tank on the return stroke, this result being made certain by the timed operation of the two controller valves with the clutch shifter, by reason of both being connected with the shifting mechanism.

While as described, all the various features of my invention are specially useful in the novel coöperative relations as set forth, it is to be understood that certain of the features of novelty are useful in other relations, and I therefore do not desire to be limited to the specific arrangement of parts set forth, nor to the details of construction herein illustrated, or in any other way, except as set forth in the appended claims.

Having described my invention, what I claim as new and desire to secure by Letters Patent is:

1. An apparatus of the kind described, comprising a support, an operating part carried thereon for movement in an operative direction and for return movement, reversible driving gearing connected to operate said part, lubricating mechanism connected with said gearing, and controlling means therefor arranged to deliver lubricant upon said operating parts on the operative movement thereof and to shut off the same on the return movement.

2. An apparatus of the kind described, comprising a support, driving means for imparting forward operative movements and return movements to a tool guided on said support, lubricating means and controlling means therefor connected for timed operation relative to said driving means to deliver lubricant on the forward operative movements of the tool and to shut off the supply thereof on the return movements.

3. Apparatus of the kind described, comprising a support, an operating part carried thereon for movement in an operative direction and for return movement, reversible driving gearing connected to operate said part including a shiftable clutch, a part of said gearing being formed and arranged to act as a pump with oil delivery connections to an operative point, and interconnected means for operating said clutch and for controlling said oil delivery connections whereby lubricant is delivered upon the operating parts on the operative movement thereof and shut off on the return movement.

4. Apparatus of the kind described, comprising a support, an operating part carried thereon for movement in an operative direction and for return movement, mechanism for moving said operating part consisting in two trains of gearing adapted to drive the operating part in opposite directions with a slidable clutch arranged to selectively engage said trains to render them operative, one of said trains being formed and arranged with oil delivery connections to serve as a pump, and common controlling means for said clutch and for said connections whereby upon movement in one direction the operating part is moved in an operative direction and supplied with oil, and upon movement in another direction the operating part is returned and the supply of oil shut off.

In testimony whereof, I have signed my name to this specification, in the presence of two subscribing witnesses.

RALPH R. LAPOINTE.

Witnesses:
   FRANK F. CUTTING,
   BENJAMIN F. LEVY.